UNITED STATES PATENT OFFICE.

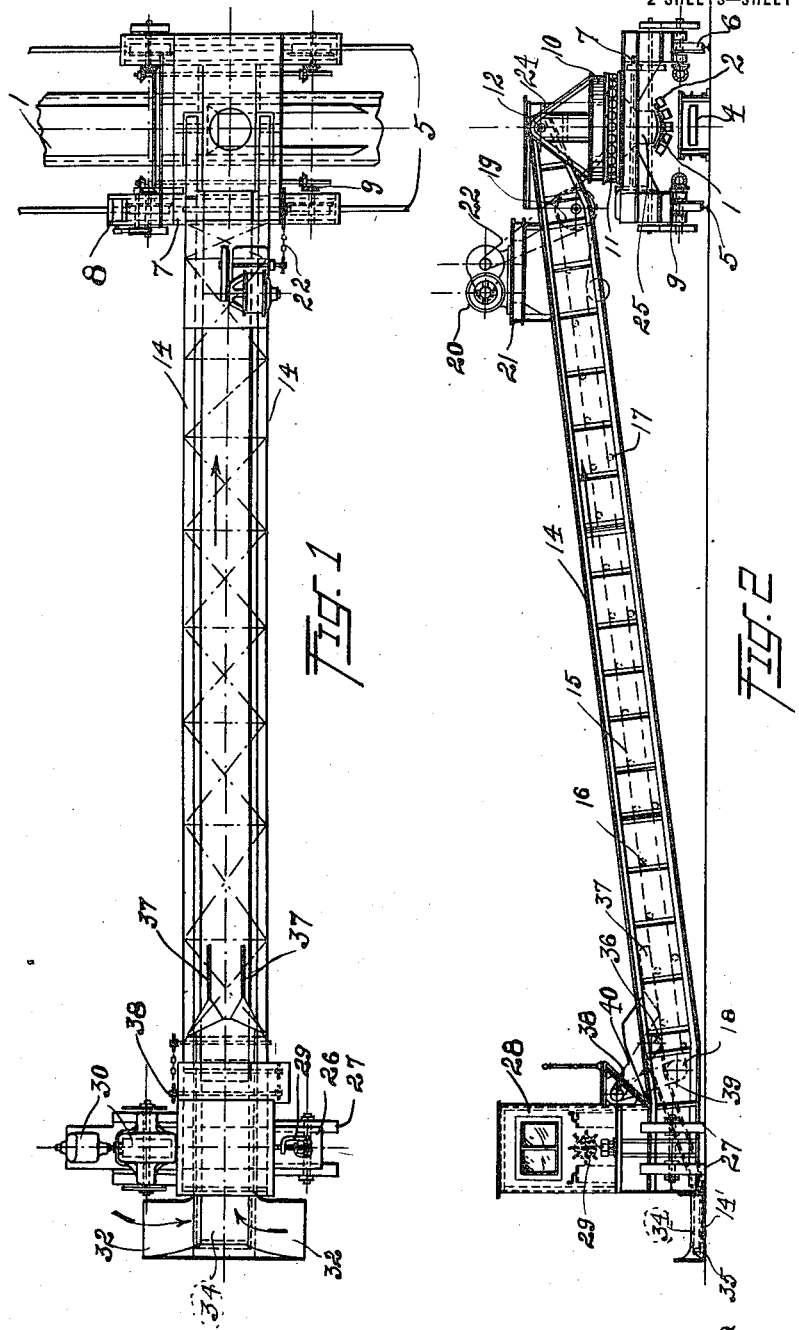

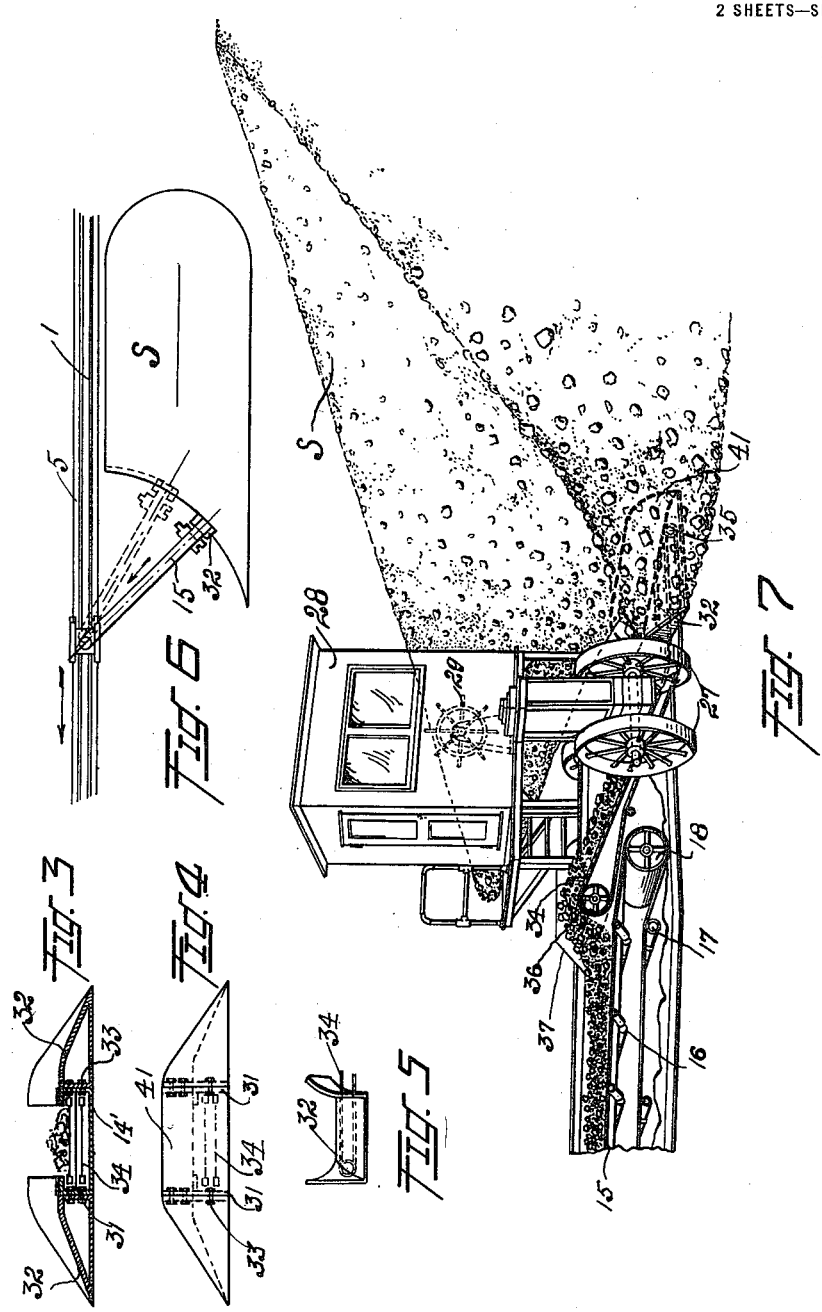

FRANCIS LEE STUART, OF WASHINGTON, DISTRICT OF COLUMBIA, ASSIGNOR TO INTERNATIONAL CONVEYOR CORPORATION, OF NEW YORK, N. Y.

SCRAPER-PLOW RECLAIMING APPARATUS.

1,271,627.   Specification of Letters Patent.   Patented July 9, 1918.

Application filed December 24, 1917. Serial No. 208,598.

*To all whom it may concern:*

Be it known that I, FRANCIS LEE STUART, a citizen of the United States, residing at Washington, in the District of Columbia, have invented certain new and useful Improvements in Scraper-Plow Reclaiming Apparatus, of which the following is a specification.

This invention relates broadly to apparatus for handling material in bulk, and more particularly to a reclaiming apparatus having scraper plows detachably secured thereto for bringing the material into operative position with the reclaiming conveyer.

The principal object of the present invention is to provide a reclaiming apparatus movably supported at one end and positively driven at the opposite end for forcing scraper plows carried thereby into a pile of material to be reclaimed.

A further object of the present invention is to provide an apparatus of this type having scraper plows which are detachably secured in position thereby making it possible to substitute different types of plows for different purposes or materials.

The foregoing and other objects, together with their attendant advantages, will be apparent as the invention becomes better understood by reference to the accompanying specification and drawings forming a part thereof, throughout the several views of which like characters of reference are used to indicate like parts.

Referring to the drawings—

Figure 1 is a plan view of my improved scraper plow reclaimer.

Fig. 2 is a side view of the apparatus shown in Fig. 1.

Fig. 3 is a detail sectional view through the scraper plows.

Fig. 4 is a detail view of the scraper plows.

Fig. 5 is an end view of one of the plows.

Fig. 6 is a diagrammatic illustration of the operation of the present invention.

Fig. 7 is a perspective view of one of the scraper plows in operative position.

It is quite customary in handling materials in bulk, such as coal, ore and the like, to transfer the material from a main source of supply to a secondary source of supply usually in the form of storage piles. Obviously it is essential that means be provided for reclaiming the material from storage and transferring the same to the desired point for loading and shipping. The present invention relates particularly to an apparatus adapted to function in this manner for expeditiously reclaiming stored material.

Referring more particularly to the drawings, I have illustrated a main conveyer 1, having the upper run thereof supported on troughing rollers 2, and the lower run carried on supporting rolls 4 as is customary in this art. Straddling the main conveyer 1 is a track-way 5 for the wheels 6 of the truck 7. The truck is preferably provided with a motor 8 whereby the same may be driven along the track-way, the motor transmitting power to the wheels through any suitable form of gearing 9. Centrally supported on the truck is a turn-table 10 having anti-friction devices 11 and carrying trunnions 12. Pivotally supported by the trunnions are girders 14, constituting a frame-work for the reclaiming belt or conveyer 15 carried thereby. Throughout its length, the conveyer 15 is supported by troughing rollers 16 and rolls 17, as before described in connection with the main conveyer belt. At its lower end the reclaiming conveyer passes around a guide roll 18, and at its upper end around a tripper roll 19. The tripper roll may be driven by a suitable source of power 20, mounted on an auxiliary frame 21 and connected to the tripper roll by a power-transmitting belt 22. The tripper roll is so arranged that upon operation of the reclaiming conveyer the same will discharge any material carried thereby into the hopper 24 on the turn-table 10, which is provided with an outlet 25 delivering to the main conveyer 1.

From the foregoing description it will be obvious that I have provided a reclaimer in the form of a boom conveyer which is bodily movable by the truck 7 around which the conveyer may swing, but always maintaining discharging relationship therewith. The outer ends of the girders 14 are carried by an end truck or tractor 26 having supporting wheels 27 surmounted by a cab or operator's platform 28. Although it is not essential that the wheels 27 be capable of a great deal of steering, it has been found desirable in practical operation to equip the truck with a steering mechanism 29 for the wheels whereby a slight steering movement thereof may be obtained. The tractor is equipped with a propelling mechanism 30 effective directly on the outer end of the reclaiming conveyer for swinging the same to the desired position.

For bringing the material into such position that it may be engaged by the reclaiming apparatus, I provide an extension 14' on the girders 14 adapted to project beyond the tractor 26. The extension is preferably provided with vertical flanges 31 adapted to receive the scraper plows detachably secured in position thereon by means of suitable fastenings 33. Extending longitudinally of the extension is an elevator 34 passing around a lower guide-roll 35 and an upper tripper roll 36 arranged above the reclaiming conveyer. The scraper plows extending transversely of the extension 14' lift material from the ground onto the elevator 34 as they are forced into the material. Mounted on opposite sides of the upper end of the elevator 34 are skirt-boards 37 which serve to guide the material in its passage from the elevator to the reclaiming conveyer. A suitable form of driving mechanism for the elevator is here shown as comprising a jack shaft or the like 38, operatively connected to the guide roll 18 by a power belt 39, and also connected to the upper tripper roll 36 by a belt 40.

In operation, the entire reclaiming apparatus is moved along the track-way 5 into a position where the reclaiming conveyer may be swung into reclaiming position with the storage pile S. The tractor 26 is then utilized for forcing one of the scraper plows 32 under the toe of the storage pile. In this position material slides by gravity over the curved mold board or edge-pieces 41 directly onto the scraper plow, which in turn delivers to the elevator discharging onto the reclaiming conveyer. The tractor may be moved from time to time as becomes necessary until the desired amount of material has been reclaimed.

By making the scraper plows 32 detachable, I am enabled to substitute plows or scrapers of different shapes and sizes whereby any kind of material may be readily reclaimed. It is also possible with the apparatus herein described, to excavate and load material, such as dirt, gravel, and the like, by simply attaching a scraper or plow of the desired kind.

Inasmuch as changes may be made in the structural embodiment of the apparatus herein disclosed, it is intended that the drawings shall be considered as illustrative of a preferred form rather than in a limiting sense.

In my application for Patent Serial No. 201,798, filed Nov. 13, 1917, I have shown a conveying system comprising a main conveyer belt, a track parallel therewith, a truck supported on said track, a motor for driving said truck, a turn-table carried by the truck and provided with a hopper delivering to said main conveyer belt, and a boom conveyer supported at its inner end by said turn-table delivering through the hopper to the main conveyer belt and which is pivotally mounted at its inner end to move about a horizontal axis whereby the outer end of the boom conveyer may be elevated and swung from one side of the track to the other to gather material on either side thereof. In said application Serial No. 201,798 I have shown means on the outer end of said boom conveyer for gathering material and delivering it to the boom conveyer, and a power driven truck on the outer end of the boom. I therefore make no claim in the present case to such subject matter.

What I claim is:—

1. A reclaiming apparatus, comprising a main conveyer belt for receiving and carrying away material to be reclaimed, a truck mounted to move parallel with said belt, a reclaiming arm pivotally connected with said truck and projecting from the side thereof, a scraper plow carried by the outer end of said arm and having its entrance end arranged transversely to the line of movement of the truck, a tractor interposed between the plow and the arm for swinging the arm relatively to the truck, and a conveyer for carrying material from the plow to the main conveyer.

2. A reclaiming apparatus, comprising a main conveyer for receiving and carrying away collected or reclaimed material, a truck mounted to travel in a direction parallel with said conveyer, a reclaiming arm pivotally connected with the truck and projecting sidewise therefrom, a scraper plow mounted on the outer end of the reclaiming arm, a tractor interposed between the plow and the reclaiming arm for supporting the latter and for moving it about its pivotal connection with the truck, and a conveyer mounted within the reclaiming arm and extending from the plow to the truck.

3. A reclaiming apparatus, comprising a main conveyer for receiving and carrying away collected or reclaimed material, a truck mounted to move in a direction parallel with the conveyer, a reclaiming arm extending sidewise from the truck and pivotally connected therewith, a scraper plow mounted on the outer end of the reclaiming arm, a conveyer extending across the rear portion of the plow and supported on the outer end of the reclaiming arm and another conveyer mounted in the reclaiming arm receiving material from said last mentioned conveyer and carrying it to the outer end of the reclaiming arm.

4. A reclaiming apparatus, comprising a conveyer belt, a truck mounted to move in a direction parallel with the belt, a reclaiming arm pivotally connected with the truck and projecting sidewise therefrom, a tractor on the outer end of the reclaiming arm, a scraper plow on the outer end of the arm and outside the tractor which has a front entrance edge, an inclined body portion and a curved mold board, a hopper carried by the truck which delivers to the conveyer and a conveyer extending from the body portion of the plow in rear of its entrance edge to said plow, the organization being such that the reclaimer may be moved along the edge of a pile of material and then swung to the desired extent to collect material by destroying the slope of the pile.

5. A reclaiming apparatus, comprising a truck, a hopper thereon, a conveyer to which the hopper delivers, a reclaimer frame projecting sidewise from the truck, a conveyer belt supported in said frame and delivering to said hopper, a tractor on the outer end of the reclaimer frame, and a scraper plow projecting from and arranged wholly beyond the outer side of the tractor and which is supported on its inner side only, said conveyer belt being arranged to extend at its outer end across the rear portion of the plow but having both its receiving and return portions below the level of the plow and said plow having a flange on its outer side which protects the outer end of the belt and over which material being gathered falls onto said belt while the gathering of material is unobstructed by any devices above the path traversed by the plow.

In testimony whereof, I have hereunto subscribed my name.

FRANCIS LEE STUART.